UNITED STATES PATENT OFFICE.

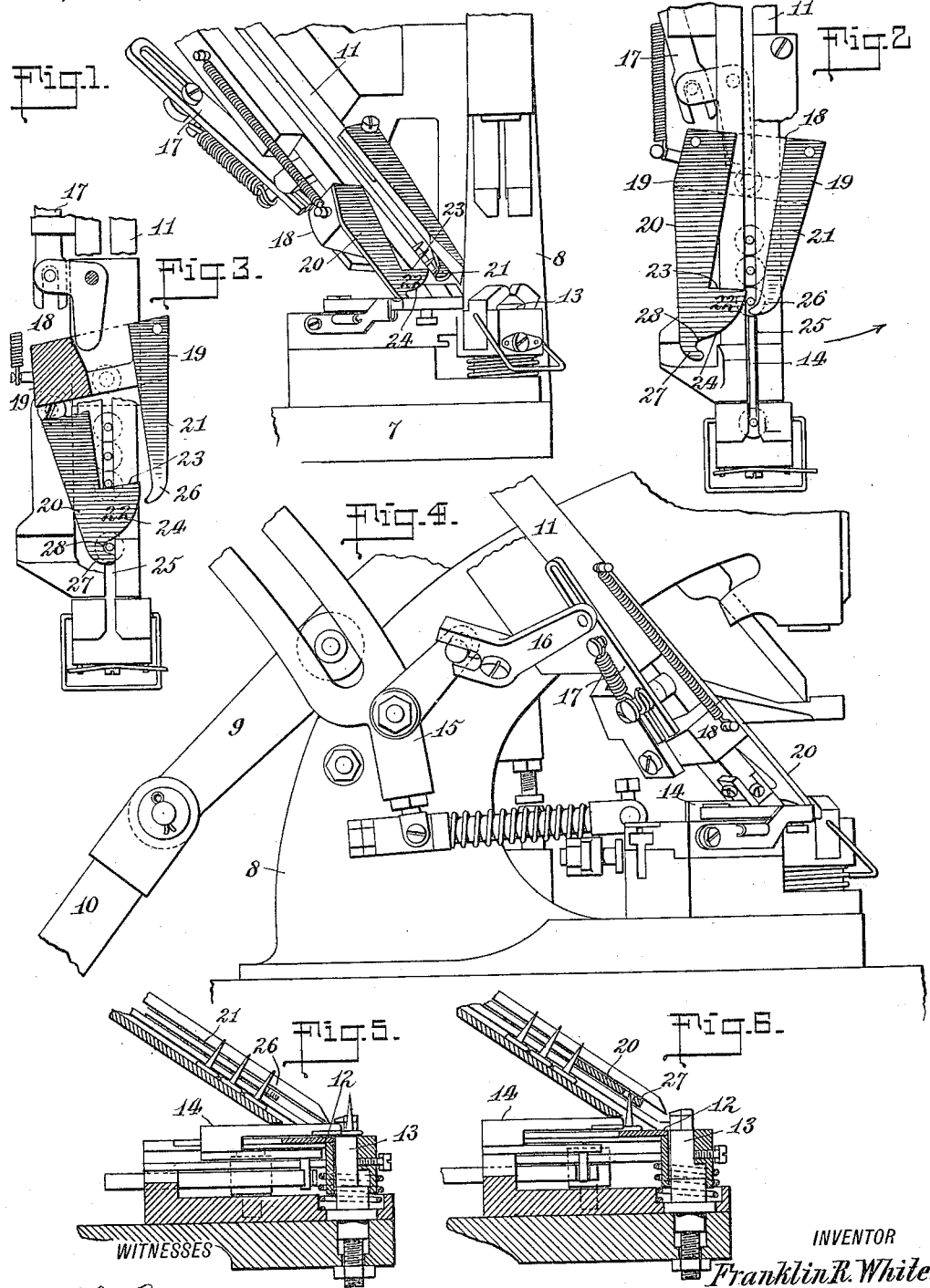

FRANKLIN R. WHITE, OF WATERBURY, CONNECTICUT, ASSIGNOR TO PATENT BUTTON COMPANY, OF WATERBURY, CONNECTICUT, A CORPORATION OF CONNECTICUT.

FASTENER-ESCAPEMENT FOR BUTTON-ATTACHING MACHINES.

1,154,680.

Specification of Letters Patent.

Patented Sept. 28, 1915.

Application filed January 26, 1915. Serial No. 4,454.

*To all whom it may concern:*

Be it known that I, FRANKLIN R. WHITE, a citizen of the United States, and a resident of Waterbury, in the county of New Haven and State of Connecticut, have made and invented certain new and useful Improvements in Fastener-Escapements for Button-Attaching Machines, of which the following is a specification.

This invention relates to a button fastener escapement, for button attaching machines, although it is to be understood that it may be used for other analogous purposes, should it be so desired.

It is the object of the present invention to provide a mechanism which will singly release the tacks or button fasteners within an inclined chute, and allow them to separately slide down to and upon a fastener receiving table, the mechanism being further arranged to temporarily arrest the tacks and maintain the same stationary thereon so as to be in proper position for a reciprocating tack feeding slide which advances the tack or fastener along the table and into position for engagement with the head of a button for the securement of the same to a garment.

In button attaching machines of that class to which the present invention appertains, it is the customary practice to successively release the fasteners in an inclined chute and allow them to slide down to and upon the fastener receiving table which is provided with a suitable guide adapted to receive the fasteners therein. Considerable difficulty has arisen due to the forward momentum of the fasteners as they slide upon the fastener receiving table, the fastener being already in motion, is not particularly well adapted to receive the reciprocating fastener feeding slide thereagainst, and furthermore, it may so happen that the fastener moves too far out upon the fastener receiving table, so as to interfere with the proper attachment of the fastener which is at that time positioned upon the anvil. The jars and chocks, incident to the actual use of the machines, are largely responsible for this difficulty experienced in the feeding of the fasteners from the chute out to and upon the anvil. I therefore, provide a fastener escapement which is adapted to successively release the fastener and allow the same to slide down to the fastener receiving table and to provide a movable stop which is temporarily moved into the path of the fastener, temporarily arresting the same and maintaining it stationary at the bottom of said chute and in proper position upon said fastener receiving table. The said stop is automatically moved away and releases the fastener as the reciprocating fastener feeding slide moves into contact therewith, whereby the fastener is advanced across the fastener receiving table and upon the fastener attaching anvil.

From the foregoing, it will be apparent that the fastener is held momentarily stationary upon the fastener receiving table during the time the preceding fastener is being secured to a garment, thus eliminating all likelihood of a fastener interfering with the proper securement of the fastener which precedes, and with these objects in view, the invention resides in the combinations and arrangements of parts, and in the details of construction hereinafter described and claimed, it being understood that changes in the precise embodiment of the invention can be made within the scope of what is claimed, without departing from the spirit of the invention.

The preferable form of my invention is disclosed in the accompanying drawings, wherein:—

Figure 1 is a fragmental view, in side elevation of a button attaching machine provided with my novel fastener escapement; Fig. 2 is a top plan view of the fastener chute, and accompanying parts with the escapement in position about to release one of the fasteners allowing it to move down the inclined chute to the fastener receiving table; Fig. 3 is a similar view after the fastener has been released and while it is being temporarily held upon the fastener receiving table by the escapement stop and prior to the actuation of the reciprocating fastener feeding slide; Fig. 4 is an enlarged view of the button attaching machine illustrating portions of the fastener feeding and releasing mechanism and more clearly disclosing the mechanism by which the entire escapement is actuated; Fig. 5 is a view in vertical section of the fastener chute and contiguous parts, illustrating in detail, the fastener receiving table, anvil, and the reciprocating fastener feeding slide; Fig. 6 is a view, similar to the foregoing, illustrating the arrestment of the fastener as it contacts with and is deposited upon the fastener receiving table, prior to the actuation of the fastener feeding slide.

Referring specifically to the several views, wherein similar reference numerals designate corresponding parts throughout, the machine bed 7 is provided with the frame 8, projecting thereabove, upon which the machine actuating lever 9 is pivoted, the connecting rod 10 being secured to the latter and adapted to oscillate the same, resulting in the attachment of a button.

An inclined fastener chute 11 is carried by the frame 8 and terminates at, so as to deliver fasteners to, the fastener receiving table 12, which fastener receiving table may also be termed a horizontal chute. An anvil 13 is mounted at the front portion of the table, upon which the fastener is moved by means of the fastener feeding slide 14, the fastener feeding slide moving beneath the inclined fastener chute 11 and adapted to advance the fastener across the fastener receiving table 12, in the usual manner. A lever 15 is mechanically connected to and reciprocates the fastener feeding slide and is also adapted to oscillate the bell crank lever 16, which, through the intervention of suitable connecting rods and allied mechanical means 17 is adapted to oscillate the escapement block 18.

The foregoing features represent the ordinary and conventional type of button attaching machine, and, with the exception of the escapement block 18, is included merely to illustrate the operation of the fastener escapement.

The block 18 is pivotally secured to the under side of the fastener chute 11 and is provided with the spaced upstanding sides 19—19, to which the arms 20—21 are secured. The arm 20 projects above the chute and is provided with the transversely extending tongue 22, which includes the straight edge 23 and curved lower edge 24. The edge 23 is adapted to project across the runway 25 which forms a part of the fastener chute and in which the prongs of the fasteners are located. Co-acting with the tongue 22 and completing the fastener releasing mechanism, is the lower extremity 26 of the arm 21, which is curved to form a lip, projecting across the runway 25 of the fastener chute and defining in connection with the curved edge 24 of the tongue 22, a passage way adapted to admit a single fastener therein. As the escapement block is operated, the fastener within the passage way between the tongue and lip 22—26, will be released, and a succeeding fastener admitted therein, the admission of a fastener to the passage way between the tongue 22 and spaced lip 26, and its subsequent releasement therefrom, necessitating a complete oscillation of the escapement block.

The lowermost extremity of the tongue 22 is provided with the hook portion 27, forming a stop or finger, having a niche 28 therein in which the shank of a fastener is adapted to be contained. The range of oscillation or movement of the escapement block is such that the stop or finger 27 is moved across the runway within the fastener chute, as disclosed in Fig. 3, and when so positioned is adapted to temporarily engage and arrest the movement of a fastener and thus check its forward momentum attained during its movement down the inclined chute. The stop 27 of the escapement is positioned below the releasing mechanism, a distance such as will bring it directly above that portion of the fastener receiving table upon which the fastener is initially deposited.

The operation of the escapement and co-acting parts of the button attaching mechanism is substantially as follows:—The fasteners travel down the inclined chute 11 from the fastener hopper (not shown) until the foremost contacts with the transversely projecting tongue 26 of the arm 21, the remaining fasteners being held thereabove due to the contact of their heads, as indicated by the dotted lines in Figs. 2 and 3 and the full lines in Figs. 5 and 6. As the escapement is actuated, the foremost fastener is admitted within the passage way between the tongue 22 and lip 26, but is prevented from passing down the inclined chute by the lip 26, which is positioned so as to extend across the chute runway 25. As the various parts of the button machine perform their various cycles of operation, the escapement block 18 is oscillated in the direction as indicated by the arrow in Fig. 2, which carries the tongue 22 across the chute runway and prevents the succeeding fastener from passing on down the chute as the lip 26 is withdrawn from the runway. This movement or withdrawal of the lip 26 allows the fastener to move, by gravity, down the chute to, and upon the horizontal fastener receiving table 12, it being aided in such motion by the curved edge 24 of the tongue 22. In this manner, the fastener releasing mechanism successively or singly feeds the fastener from the inclined chute to the fastener receiving table. In order to prevent the fastener from moving forwardly across the table, due to the momentum attained in its downward motion within the chute, or by reason of such jars and shocks as are necessarily incident to the operation of the machine, the stop or finger 27 automatically moves across the fastener runway provided upon the fastener receiving table and engages the shank of the fastener, as illustrated in Fig. 3, preventing its premature movement across the fastener receiving table which would interfere with the proper securement of the fastener and button which preceded the same. The fastener is thus held stationary upon the fastener receiving table while the preceding button and fastener are being secured together, after which time the escapement block is oscillated from the position illustrated in Fig. 3 into the position illustrated in Fig. 2, releasing the fastener which is then resting upon the fastener receiving table and allowing it to be moved forward upon the securing anvil 13. This oscillation of the escapement block also allows a second fastener to pass down into the passage way between the tongues 22—26, subsequent to its completion of its journey down the chute and on to the fastener receiving table. In this manner, the fastener is held against accidental movement across the fastener receiving table and all likelihood and danger of the subsequent fastener interfering with the proper action of that which preceded it is accordingly eliminated, a fastener being released and allowed to move downwardly to and upon the fastener receiving table during the interval of time in which the preceding fastener is being secured to the head of a button. The fastener is accordingly held stationary at a point close to the securing anvil and it may therefore be moved on to the anvil in a quick and precise manner by the fastener feeding slide.

Having thus described my invention, what I claim is:—

1. In a machine of the class described, a chute, a fastener receiving table, means adapted to singly release the fasteners, and means mechanically connected to and operating in conjunction with the said releasing means adapted to engage the fasteners as they reach the fastener receiving table and to hold the same momentarily stationary thereon.

2. In a button attaching machine, an inclined fastener chute, a fastener receiving table adapted to receive fasteners therefrom, a fastener releasing mechanism for singly releasing the fasteners within said chute, and means mechanically connected to and operating in conjunction with the said fastener releasing mechanism adapted to engage the released fastener as it reaches the fastener receiving table and to hold the same momentarily stationary thereon.

3. Means for feeding fasteners to the anvil of a button attaching machine, comprising, an inclined fastener chute, a fastener receiving table therebelow and means extending above the runway within said chute adapted to singly release the fasteners located therein, said means provided with a hooked lower extremity adapted to move above the fastener receiving table and to hold the released fasteners stationary thereon during the attachment of the preceding one.

4. A fastener escapement mechanism for button attaching machines comprising spaced superposed tongue and lip members, defining a passage way therebetween adapted to singly release fasteners located within a fastener chute, one of said members provided with a spaced finger adapted to engage the released fastener and hold the same momentarily stationary subsequent to its discharge from the lower extremity of said chute.

5. In a button attaching machine, an inclined fastener chute, a receiving chute located below the lower extremity thereof, a reciprocating fastener feeding slide adapted to advance fasteners across said fastener receiving chute, automatically operated means for singly releasing the fasteners located within said chute adapted to singly deliver the same to and upon said receiving chute, and automatically operated means mechanically connected to and operating in conjunction with said reciprocating fastener feeding slide adapted to engage the released fasteners upon their discharge into said fastener receiving chute and adapted to hold the same stationary during the attachment of the preceding fastener and prior to the impingement of the reciprocating fastener feeding slide thereagainst.

6. In a button attaching machine, an inclined fastener chute, a horizontal fastener receiving table located below the lower discharge extremity thereof, means for advancing the fasteners across the table subsequent to their discharge thereon from said chute, an oscillating escapement block, means for automatically oscillating the same, superimposed spaced tongue and lip members carried by said oscillating block adapted to alternately project across the runway within said chute for the successive releasement of the fasteners therein, and a stop carried by one of said spaced members adapted to project above the said receiving table contiguous to the extremity of said chute and to hold the fasteners stationary thereon during the attachment of the preceding one.

7. An apparatus of the class described, comprising an inclined chute, a horizontal fastener receiving table located therebelow and adapted to receive the discharged fasteners therefrom, means adapted to advance fasteners across said receiving table, and a fastener escapement mechanism projecting across the runway within said chute and adapted to successively release the fasteners located therein, said escapement mechanism including, a tongue with a rounded lower edge adapted to contact with the released fasteners and positively move the same downwardly within said chute for the discharge of the fasteners therefrom, and a stop member carried by said tongue adapted to engage the said released fastener upon its attainment of said receiving table and momentarily arrest the same during the attachment of the preceding fastener and prevent its accidental movement across said receiving table.

8. In a machine of the class described, an inclined chute, a horizontal chute communicating therewith, an automatic fastener releasing mechanism adapted to successively release the fasteners located in said inclined chute allowing them to travel down to said horizontal chute, and automatically operated means connected to and operating in conjunction with said fastener releasing mechanism adapted to engage said fasteners as they reach said horizontal chute and to check the momentum thereof and hold the said fasteners stationary thereon.

9. In a button attaching machine, an inclined chute adapted to receive fasteners therein and to maintain the same in a single row, an automatic fastener releasing mechanism located intermediate the chute ends adapted to successively release the fasteners therein, a horizontal fastener chute communicating with said inclined chute, and means connected with the said releasing mechanism adapted to engage a fastener subsequent to its releasement from said releasing mechanism and immediately upon its reaching the said horizontal chute and adapted to check the forward momentum thereof and to maintain the same stationary thereon.

10. In a button attaching machine of the class described, a horizontal table adapted to supply button fasteners thereto, an inclined chute adapted to supply said fasteners to said table, a fastener escapement controlling the movement of fasteners down said chute, said escapement including a mechanism adapted to singly release the fasteners located in said chute and adapted to singly supply fasteners to said table, and means adapted to move into contact with and positively engage said fasteners upon their discharge from said inclined chute and adapted to maintain said fasteners stationary during the attachment of the preceding fastener.

Signed at Waterbury in the county of New Haven and State of Connecticut this 19th day of January A. D. 1915.

FRANKLIN R. WHITE.

Witnesses:
JULIA A. CREEM,
KATHARINE A. RUBEY.

Copies of this patent may be obtained for five cents each, by addressing the "Commissioner of Patents, Washington, D. C."